US010386575B2

(12) United States Patent
Côté et al.

(10) Patent No.: US 10,386,575 B2
(45) Date of Patent: Aug. 20, 2019

(54) OPTICAL ASSEMBLY AND METHOD FOR COUPLING A WAVEGUIDE ARRAY TO A PHOTONIC-INTEGRATED CIRCUIT

(71) Applicant: INSTITUT NATIONAL D'OPTIQUE, Québec (CA)

(72) Inventors: Patrice Côté, Saint-Augustin-de-Desmaures (CA); Patrick Paradis, Québec (CA); Marc Lévesque, Saint-Augustin-de-Desmaures (CA); Jacques Régnier, Quebec (CA); Alex Paquet, Québec (CA)

(73) Assignee: INSTITUT NATIONAL D'OPTIQUE, Québec (CA)

(*) Notice: Subject to any disclaimer, the term of this patent is extended or adjusted under 35 U.S.C. 154(b) by 0 days.

(21) Appl. No.: 15/475,264

(22) Filed: Mar. 31, 2017

(65) Prior Publication Data

US 2017/0285264 A1 Oct. 5, 2017

Related U.S. Application Data

(60) Provisional application No. 62/316,643, filed on Apr. 1, 2016.

(51) Int. Cl.
*G02B 6/125* (2006.01)
*B29C 65/02* (2006.01)
(Continued)

(52) U.S. Cl.
CPC .............. *G02B 6/125* (2013.01); *B29C 65/02* (2013.01); *B29C 65/48* (2013.01); *B29D 11/00* (2013.01);
(Continued)

(58) Field of Classification Search
CPC .................................. G02B 6/12; G02B 6/125
See application file for complete search history.

(56) References Cited

U.S. PATENT DOCUMENTS 4,220,398 A * 9/1980 Dalgoutte .............. G02B 6/255 385/63
4,747,657 A 5/1988 Chaoui et al.
(Continued)

FOREIGN PATENT DOCUMENTS

WO 2014112949 A1 7/2014

OTHER PUBLICATIONS

Lee Carroll et al., "Design Rules for Silicon Photonic Packaging at Tyndall Institute", Jan. 2015, pp. 1-13, Cork, Ireland.

*Primary Examiner* — Sung H Pak
*Assistant Examiner* — Hoang Q Tran
(74) *Attorney, Agent, or Firm* — Reno Lessard; Norton Rose Fulbright Canada LLP

(57) ABSTRACT

An optical assembly generally having a substrate; a photonic-integrated circuit (PIC) mounted on the substrate, the PIC having a plurality of optical ports; a first structure having a bottom surface connected to the substrate, and a first planar surface extending perpendicularly to the substrate; a second structure having a second planar surface being connected to the first planar surface of the first structure via an adhesive, and a support surface; and a waveguide array having a support surface being connected to the support surface of the second structure, the waveguide array having a plurality of waveguides each defining an optical path, with the optical paths lying in a waveguide plane, the waveguide plane being perpendicular to the first and second planar surfaces, the optical paths being maintained in optical alignment with corresponding ones of the optical ports via the adhered first and second planar surfaces.

23 Claims, 13 Drawing Sheets

(51) Int. Cl.

| | |
|---|---|
| ***B29C 65/48*** | (2006.01) |
| ***B29D 11/00*** | (2006.01) |
| ***G02B 6/30*** | (2006.01) |
| ***G02B 6/42*** | (2006.01) |
| *B29L 11/00* | (2006.01) |
| *G02B 6/12* | (2006.01) |

(52) U.S. Cl.

CPC ............ *B29D 11/0075* (2013.01); *G02B 6/30* (2013.01); *G02B 6/4225* (2013.01); *G02B 6/4226* (2013.01); *B29L 2011/00* (2013.01); *G02B 6/4239* (2013.01); *G02B 6/4249* (2013.01); *G02B 2006/12061* (2013.01)

(56) References Cited

U.S. PATENT DOCUMENTS

| | | | | |
|---|---|---|---|---|
| 5,026,138 | A | 6/1991 | Boudreau et al. | |
| 6,320,706 | B1 | 11/2001 | Richard et al. | |
| 6,512,642 | B1 | 1/2003 | Bourcier et al. | |
| 6,571,041 | B2 | 5/2003 | Bourcier et al. | |
| 6,608,959 | B2 | 8/2003 | Jang et al. | |
| 6,909,827 | B2 | 6/2005 | Schmitt et al. | |
| 7,146,082 | B2 | 12/2006 | Zbinden | |
| 2015/0338585 | A1 * | 11/2015 | Li .......................... | G02B 6/423 385/31 |

* cited by examiner

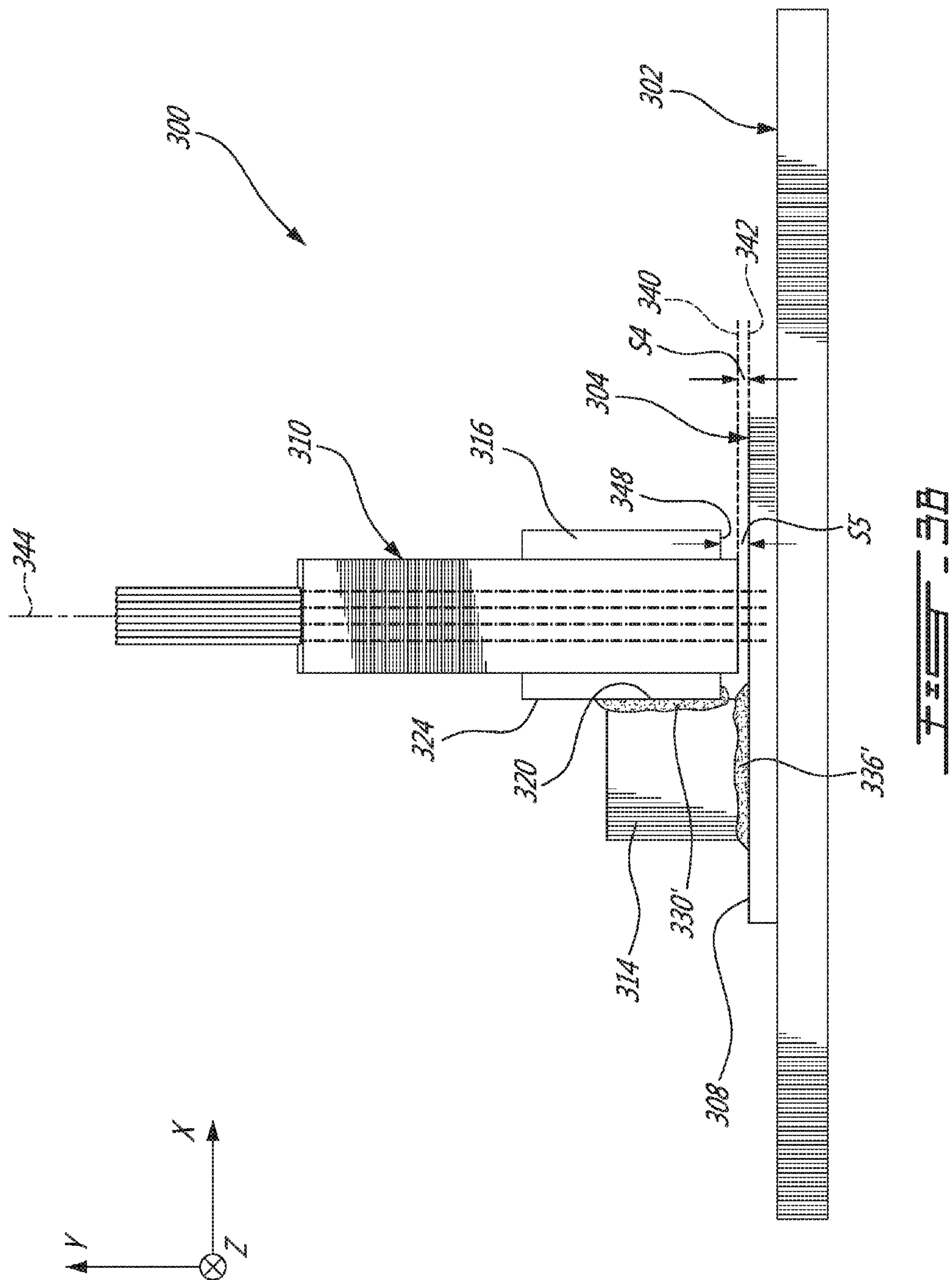
300
302
342
340
S4
304
310
316
348
S5
344
324
320
336'
330'
314
308
X
Y
Z

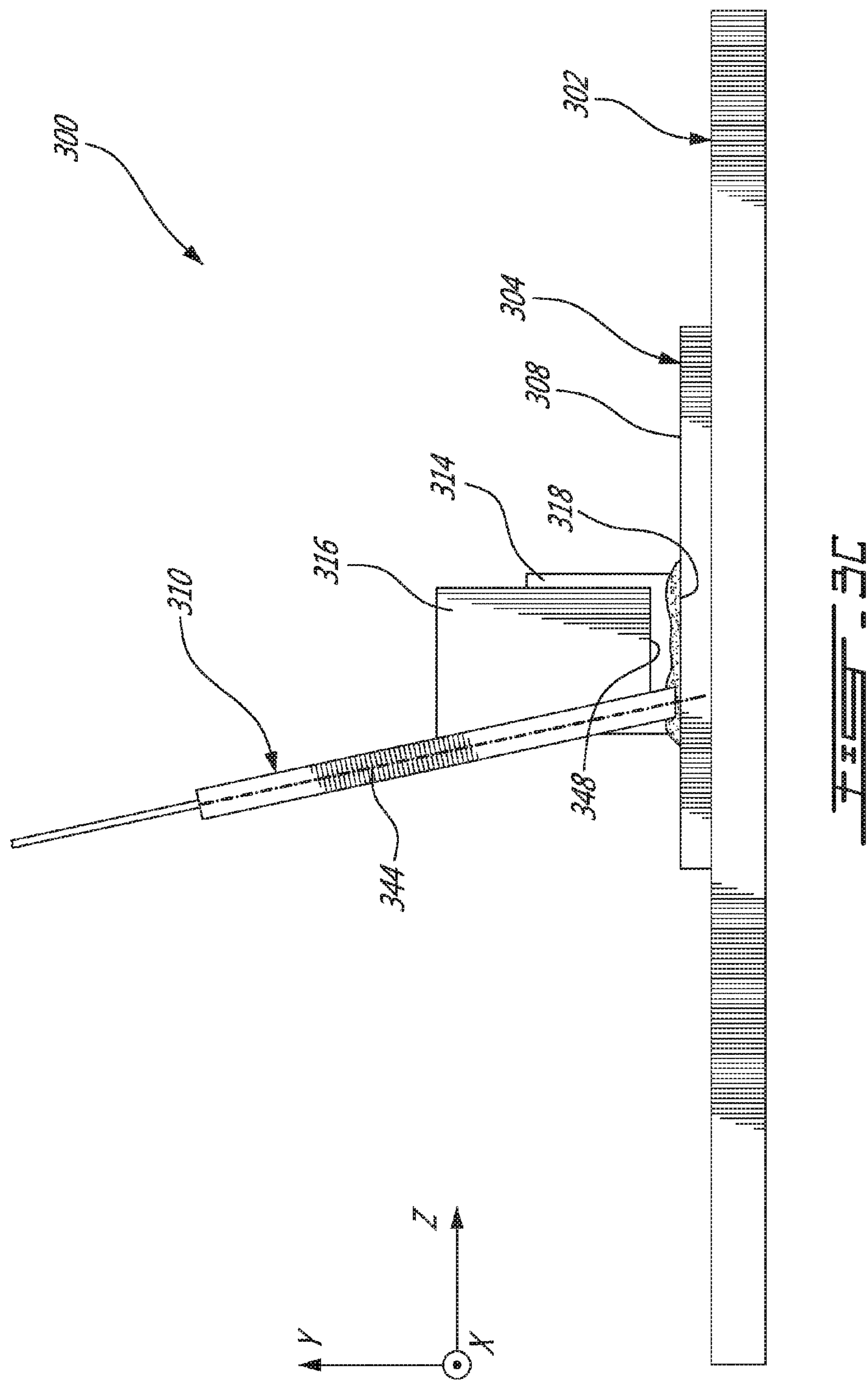
300
302
304
308
314
316
318
310
344
348
Z
Y
X 400
402
404
410
444
440a
440b
Z
Y
X 500
502
508
504
516
512
510
514
518
Z
Rz
X
Ry
Y
Rx 600
602
604
608
616
610
644
Z
Rz
X
Ry
Y
Rx

OPTICAL ASSEMBLY AND METHOD FOR COUPLING A WAVEGUIDE ARRAY TO A PHOTONIC-INTEGRATED CIRCUIT

FIELD

The improvements generally relate to the field of optical, opto-mechanical and electro-optical components, and more specifically to such components having photonic-integrated circuits (PICs).

BACKGROUND

The development of smaller optical and electro-optical devices having improved specifications has been investigated to a certain extent. In some applications, it was found useful to use PICs, i.e. devices which involve the use of light directly on a photonic chip in a manner analogous to the use of electricity in electronic chips.

These PICs are generally configured to transmit light from a photonic device to another and to process it via waveguides present on the photonic chip. In some PICs, the incoming light is received from an external waveguide via direct coupling to the optical port of one of the waveguides of the PIC. Such direct coupling of the incoming light into the waveguide of the photonic chip can be challenging since these waveguides typically have dimensions much smaller than those of the external waveguide. To address this challenge, it was known to focus light exiting from the external waveguide to a small spot and to precisely position the external waveguide so as to provide the small spot right onto the optical port of the waveguide for direct coupling of the incoming light into the PICs.

Although some techniques exist to align a laser beam relative to the optical axis of an optical element, such as the one described in U.S. Pat. No. 6,512,642 (BOURCIER et al.), there remains room for improvement, particularly in providing a method for optically coupling a waveguide array to a PIC.

SUMMARY

In accordance with one aspect, there is provided an optical assembly comprising: a substrate; a photonic-integrated circuit (PIC) mounted on the substrate, the PIC having a plurality of optical ports; a first structure having a bottom surface connected to the substrate and a first planar surface perpendicular to the substrate; a second structure having a second planar surface connected to the first planar surface of the first structure via an adhesive, and a support surface; and a waveguide array having a support surface being connected to the support surface of the second structure, the waveguide array having a plurality of waveguides each defining an optical path, with at least two of the optical paths lying in a waveguide plane, the waveguide plane being perpendicular to the first and second planar surfaces, the at least two of the optical paths being maintained in optical alignment with corresponding ones of the optical ports via the adhered first and second planar surfaces.

In accordance with another aspect, there is provided a method for optically coupling a waveguide array to a PIC mounted on a substrate, the method using a first structure and a second structure, the PIC having a plurality of optical ports, the first structure having a bottom surface and a first planar surface, the second structure having a second planar surface and a support surface, the waveguide array having a plurality of waveguides each defining an optical path, with at least two of the optical paths lying in a waveguide plane, the waveguide array having a support surface, the method comprising the steps of: connecting the bottom surface of the first structure to the substrate; connecting the support surface of the second structure to the support surface of the waveguide array; using a manipulator, engaging the first planar surface of the first structure with the second planar surface of the second structure with a curable adhesive inserted therebetween, the waveguide plane being perpendicular to the first and second planar surfaces, and adjusting a position and an orientation of the first and second structures to optically couple the at least two of the optical paths with corresponding ones of the plurality of optical ports of the PIC; and curing the curable adhesive to permanently fix the position and the orientation of the first and second structures.

In accordance with one aspect, there is provided an interconnect structure for use in optically coupling a waveguide array to a PIC mounted on a substrate, the PIC having a plurality of optical ports, the waveguide array having a plurality of waveguides each defining an optical path, with at least two of the optical paths lying in a waveguide plane, the waveguide array having a support surface, the interconnect structure comprising: a first structure having a bottom surface being connectable to the substrate, and a first planar surface extending in a non-parallel manner relative to the bottom surface of the first structure; and a second structure having a second planar surface being connectable to the first planar surface of the first structure via a curable adhesive, and a support surface being connectable to the support surface of the waveguide array, the waveguide plane being perpendicular to the first and second planar surfaces, the at least two of the optical paths being maintainable in optical alignment with corresponding ones of the optical ports via the adhered first and second planar surfaces.

In an embodiment, the first and second surfaces are perpendicular to the substrate. In such an embodiment, movements such as translation along an axis and/or rotation about an axis can be independent from one another which can make more intuitive the optical alignment of the waveguide array relatively to the PIC. The words “perpendicular” and “parallel” are not meant to be interpreted in a limiting manner.

Many further features and combinations thereof concerning the present improvements will appear to those skilled in the art following a reading of the instant disclosure.

DESCRIPTION OF THE FIGURES

In the figures,

FIG. 1D is a sectional view of the optical assembly of FIG. 1A taken along lines 1D-1D of FIG. 1A;

FIG. 2B is a side elevation view of the optical assembly of FIG. 2A;

FIG. 3C is a side elevation view of the optical assembly of FIG. 3A;

DETAILED DESCRIPTION

Figure 1A:
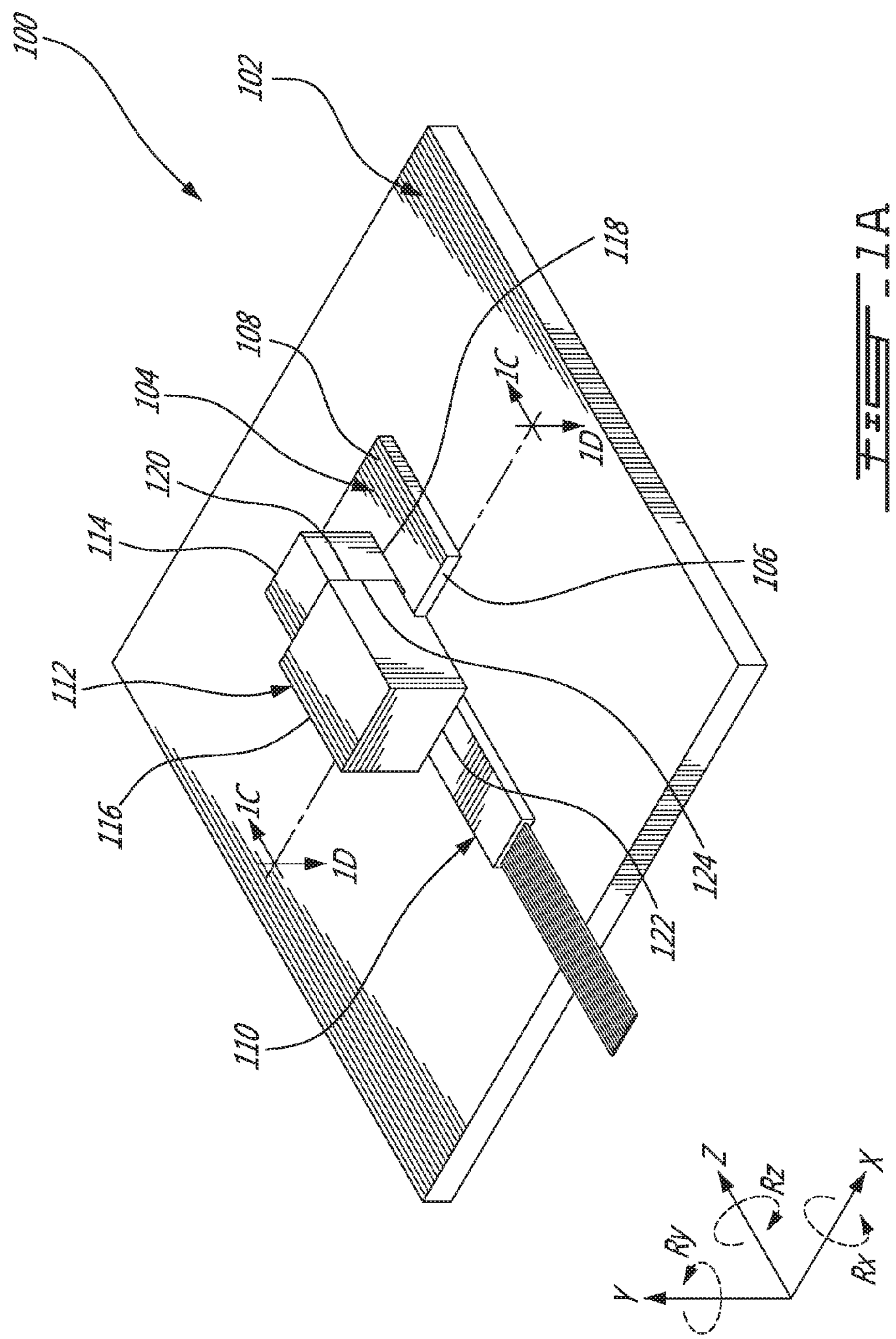
FIG. 1A is an oblique view of an example of an optical assembly having a waveguide array optically coupled to a PIC via an interconnect structure in an edge coupling configuration, the interconnect structure having a first structure directly connected to the PIC.

FIG. 1A shows an example of an optical assembly 100 in an edge coupling configuration.

Broadly described, the optical assembly 100 has a generally planar substrate 102 with a PIC 104 mounted thereto. The PIC 104 has a plurality of adjacent optical ports distributed either along one or more surfaces of the PIC 104. In the example illustrated in FIG. 1A, the optical ports are distributed along a single side surface 106 of the PIC 104. As depicted, a waveguide array 110 having a plurality of waveguides is optically coupled to the PIC 104 using an interconnect structure 112. By using the interconnect structure 112, optical paths of the waveguides of the waveguide array 110 are maintained in optical alignment with corresponding optical ports of the PIC 104 to allow optical communication between the waveguide array 110 and the PIC 104. Such a connection can also be made in a vertical coupling configuration when the optical ports are distributed along a top surface 108 of the PIC 104, as will be described below.

It will be noted that an optical path is defined herein as the path that an optical signal takes as it exits an end facet of a corresponding waveguide. Indeed, in cases where an end facet of a given waveguide is perpendicular to an optical axis of the given waveguide, the optical path and the optical axis of that given waveguide are collinear.

As shown, the interconnect structure 112 has a first structure 114 and a second structure 116. The first structure 114 has a bottom surface 118 which is connected to the PIC 104 and a first planar surface 120 which is non-parallel to the bottom surface 118 (e.g., perpendicular thereto). The second structure 116 has a support surface 122 which is connected to the waveguide array 110 and a second planar surface 124 which is non-parallel to the support surface 122 (e.g., perpendicular thereto). The first and second structures can be provided in the form of blocks or shells made up of one or more materials. For instance, the first structure can have a parallelepiped shape (e.g., a cubic shape), and the second structure can have a parallelepiped shape with a recessed portion (e.g., a chamfer-like shape, an L-shape and/or a gnomon-like three-dimensional shape).

As can be understood, coupling the waveguide array 110 to the PIC 104 to allow suitable optical communication therebetween can be challenging, as there is not one but many waveguides to optically couple to corresponding optical ports of the PIC. Accordingly, there was a need for methods allowing optical alignment of the waveguide array 110 relatively to the PIC 104 and fixing the waveguide array 110 to the PIC 104 while maintaining the optical alignment.

There is thus described a method for coupling the waveguide array 110 to the PIC 104 using the interconnect structure 112. An example of such a method is presented in the following paragraphs with reference to FIG. 1B.

The exemplary method includes a step of connecting the bottom surface 118 of the first structure 114 to the substrate 102. In this example, the bottom surface 118 of the first structure 114 is indirectly connected to the substrate 102 via the PIC 104. In other words, the bottom surface 118 of the first structure 114 is connected directly to the PIC 104.

The method includes a step of connecting the support surface 122 of the second structure 116 to a support surface 126 of the waveguide array 110.

The method includes a step of, using a manipulator 128, engaging the first planar surface 120 of the first structure 114 with the second planar surface 124 of the second structure 116 with a curable adhesive 130 inserted therebetween. The first and second planar surfaces 120, 124 generally have a suitable roughness allowing satisfactory adhesion. The curable adhesive 130 can be applied to either or both the first and second planar surfaces 120, 124. The curable adhesive 130 can be provided in the form of a layer of curable adhesive.

It is contemplated that at least two of the optical paths lie in a waveguide plane 144 which is perpendicular to the first and second planar surfaces 120, 124 and that the at least two of the optical paths can be maintained in optical alignment with corresponding ones of the optical ports via the adhered planar surfaces.

Still using the manipulator 128, the method has a step of adjusting a position and an orientation of the waveguide plane 144 to optically couple the optical paths of the plurality of waveguides of the waveguide array 110 to corresponding ones of the plurality of optical ports of the PIC 104.

Such a step allows movement of the second structure 116 relative to the first structure 114 while the curable adhesive 130 is not yet cured. The second planar surface 124 of the second structure 116 is thus free to move in at least three degrees of freedom, i.e. translations along two orthogonal axes lying in a plane parallel to the first and second planar surfaces 120, 124 and rotation about the axis normal to the first and second planar surfaces 120, 124. In this case, the first and second planar surfaces 120, 124 are perpendicular to the substrate 102 so that the three degrees of freedom include translations along the x and y axes and rotation about the z axis.

Figure 1B:
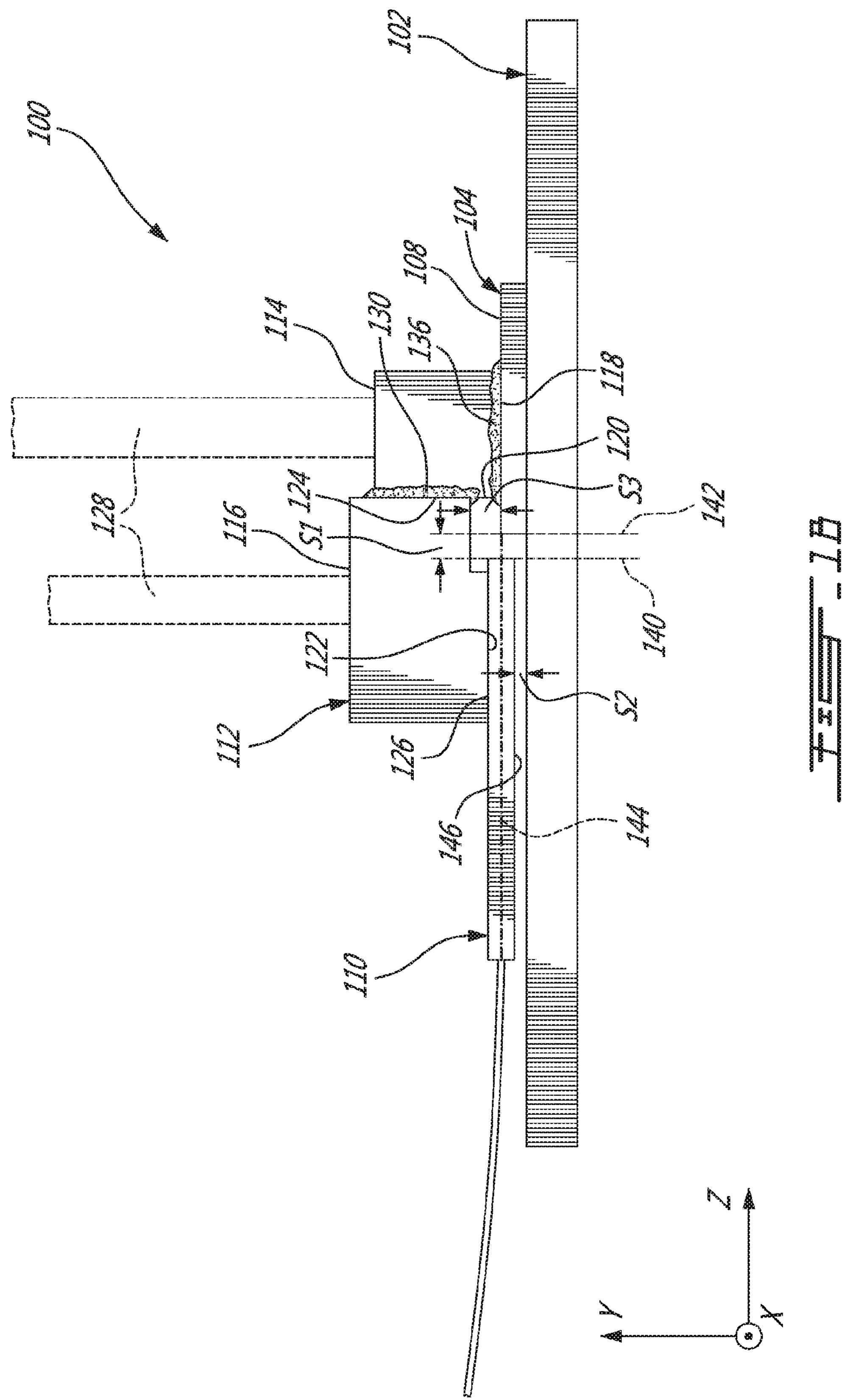
FIG. 1B is a side elevation view of the optical assembly of FIG. 1A.
Figure 1C:
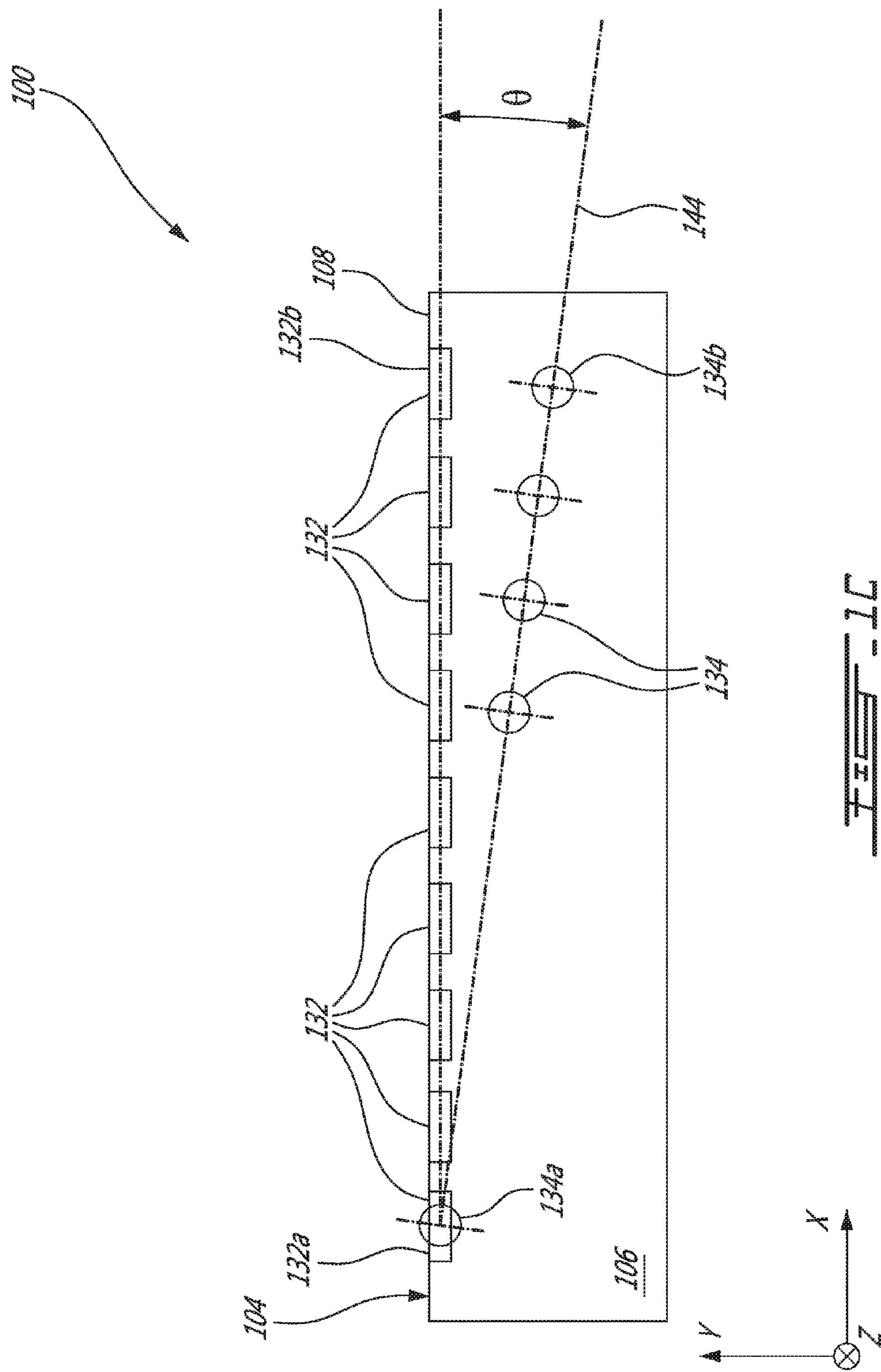
FIG. 1C is a sectional view of the optical assembly of FIG. 1A taken along lines 1C-1C of FIG. 1A.
Figure 10:
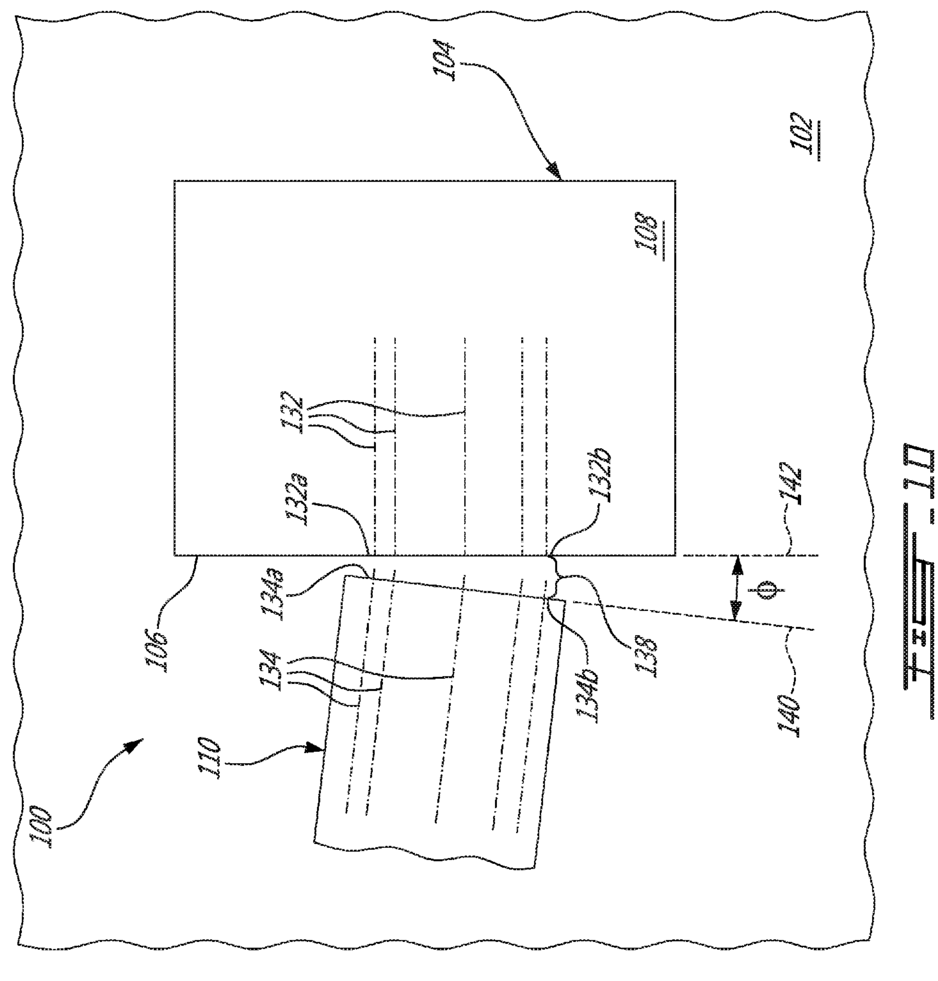

For instance, FIG. 1C is a sectional view of the optical assembly 100 taken along lines 1C-1C of FIG. 1A showing the side surface 106 of the PIC 104 and its optical ports 132. In this example, each of the optical ports 132 has a two-dimensional surface, and more specifically a rectangular surface, which is provided on the side surface 106, near the top surface 108 of the PIC 104. The waveguides 134 of the waveguide array 110 are shown lying in the waveguide plane 144. As it will be understood, rotation of the second structure 116 about the z axis, normal to the first and second planar surfaces 120, 124, allows to reduce the roll angle θ that the line joining the optical ports 132 of the PIC 104 forms with the waveguide plane 144. In this manner, optical communication can be enabled not only between the left-most waveguide 134*a* and the leftmost optical port 132*a* but also between the rightmost waveguide 134*b* and the right-most optical port 132*b* as well as between all pairs of waveguides and optical ports in-between.

Referring back to FIG. 1B, when the optical alignment between the optical paths of the waveguide array 110 and the optical ports of the PIC 104 is deemed satisfactory, the method has a step of curing the curable adhesive 130 to permanently fix the position and the orientation of the first and second structures 114, 116 relative to one another. In some embodiments, the first structure is fixedly connected to the substrate 102 and the step of curing the curable adhesive 130 permanently fixes the position and the orientation of the first and second structures 114, 116. In these embodiments, the optical alignment can be maintained even when the structures 114, 116 are no longer held relative to one another by the manipulator 128.

The exemplary method for coupling the waveguide array 110 to the PIC 104 via the interconnect structure 112 can have other, optional steps.

For instance, in this embodiment, the bottom surface 118 of the first structure 114 is planar so that the method includes a step of engaging the bottom surface 118 with the top surface 108 of the PIC 104 with a curable adhesive 136 therebetween. The curable adhesive 136 can be applied to either or both of the bottom surface 118 and the top surface 108 depending on the application. This curable adhesive 136 can be provided in the form of a layer of curable adhesive.

Still using the manipulator 128, the method has a step of adjusting the position and the orientation of the first structure 114 relative to the PIC 104 to help align each of the optical paths of the plurality of waveguides of the waveguide array 110 with a corresponding one of the plurality of optical ports of the PIC 104.

Such a step allows movement of the first structure 114 relative to the PIC 104 while the curable adhesive 136 is not yet cured such that the bottom surface 118 of the first structure 114 is free to move in at least three degrees of freedom relative to the top surface 108 of the PIC 104, i.e. translations along two orthogonal axes lying in a plane parallel to the bottom and top surfaces 118, 108 and rotation about the axis normal to the bottom and top surfaces 118, 108. The three degrees of freedom then include translations along the x and z axes and rotation about the y axis.

FIG. 1D is a sectional view of the optical assembly 100 taken along lines 1D-1D of FIG. 1A showing the top surface 108 of the PIC 104. In this example, the optical paths 138 of the waveguides 134 and the optical ports 132 of the PIC 104 are shown from above. As shown, the end facets of the waveguides 134 of the waveguide array 110 lie in a same facet plane 140. The two-dimensional surfaces of the optical ports 132 are distributed along the side surface 106 of the PIC 104 such as to define an optical port plane 142 which, in this embodiment, coincides with the side surface 106 of the PIC 104. As it will be understood, the rotation of the first structure 114 about the y axis normal to the substrate 102 allows to reduce the yaw angle ϕ that is formed between the facet plane 140 and the optical port plane 142. In this manner, optical communication can be enabled not only between the waveguide 134*a* and the optical port 132*a* but also between the waveguide 134*b* and the optical port 132*b*.

Referring back to FIG. 1B, when the optical alignment between the optical paths of the waveguide array 110 and the optical ports of the PIC 104 is deemed satisfactory, the method has a step of curing the curable adhesive 136 to permanently fix the position and the orientation of the first structure 114 relative to the PIC 104, so that the manipulator 128 is no longer required. It is noted that the step of curing the curable adhesive 130 and the step of curing the curable adhesive 136 can be performed simultaneously or successively.

As it will be understood, since the set of surfaces 120, 124 is distinct from and not parallel to the set of surfaces 118, 108, the interconnect structure 112 offers a total of five degrees of freedom for alignment of the waveguide array 110 relative to the PIC 104. In this case, these five degrees of freedom include translations along the x, y and z axes and rotations about the y and z axes. As it will be understood, the set of surfaces 120, 124 offers three degrees of freedom while the set of surfaces 118, 108 also offers three degrees of freedom. In this case, the translation along the x-axis is redundant as it is a degree of freedom offered by both the sets of surfaces 120, 124 and 118, 108. The two distinct sets of non-parallel surfaces 120, 124 and 118, 108 thus yield a total of five distinct degrees of freedom.

Considering that six degrees of freedom exist, one of these degrees of freedom is designated to be fixed because it was found that this degree of freedom was the least stringent one in the process of aligning the waveguide array 110 to the PIC 104 in the edge coupling configuration. In case of edge coupling, i.e. when the optical paths 138 are parallel to the substrate 102 and when the optical ports 132 of the PIC 104 are distributed along the side surface 106 of the PIC 104, the least stringent degree of freedom was found to be the rotation about an axis given by the intersection of the waveguide plane 144 with the optical port plane 142. With reference to FIG. 1B, this axis corresponds to the x axis.

In this embodiment, the edge coupling can be further characterized by the fact that the waveguide plane 144 is perpendicular to the side surface 106 of the PIC 104, or equivalently to the optical port plane 142, and that the facet plane 140 is parallel to the optical port plane 142 once the alignment process is completed. In another embodiment, however, the second structure 116 is configured to orient the waveguide array such that the waveguide plane 144 forms a non-vanishing angle with the substrate. Each end facet is then not perpendicular to its respective waveguide such as to project a respective optical path towards the optical port plane. In this case, the facet plane would not be parallel to the optical port plane.

As it can be seen, the first and second structures 114, 116 are sized and shaped to permit the facet plane 140 of the waveguide array 110 to move relative to the optical port plane 142. More specifically, in this embodiment, the facet plane 140 is spaced by a first spacing s1 from the optical port plane 142 to allow room for translation along the z axis and rotation about the y axis. The first spacing s1 can vary depending on the application. For instance, the first spacing s1 can be reduced to a minimum in an embodiment where each waveguide of the waveguide array has a ultra-high numerical aperture (UHNA). In another embodiment, the waveguides of the waveguide array are lensed waveguides (i.e. the end facet of each waveguide of the array is provided with a lens) so it can be preferred to adjust the first spacing s1 such that it corresponds to the working distance of the lenses.

Moreover, still referring to FIG. 1B, the support surface 122 of the second structure 116 faces the substrate 102 such that the waveguide array 110 is suspended over the substrate 102 to provide a second spacing s2 between a bottom surface 146 of the waveguide array 110 and the substrate 102. There is also provided a third spacing s3 between the support surface 122 of the second structure 116 and the top surface 108 of the PIC 104. The second and third spacings s2, s3 can be selected to allow enough room for the translation of the waveguide array 110 along the y axis and for its rotation about the z axis.

In some applications, either or both the curable adhesives 130, 136 are light sensitive curable adhesive(s) (e.g., a UV-sensitive adhesive) and the first and/or second structures 114, 116 is/are made of a transparent material, i.e. a material transparent to the curing light (e.g., a UV-transparent material), so that the step of curing the curable adhesive includes a step of illuminating, with a beam of curing light (e.g., UV light), the light-sensitive curable adhesive through the first and/or second structure(s) 114, 116.

It will be appreciated that the use of the light-sensitive adhesive allows for long work times and short on-demand cure time. It can require a low input of energy, and can be cured at room temperature. Curing with light such as UV light can thus reduce distortions and misalignments caused by differences in the thermal expansion coefficient of the various components used in alternative methods such as welding or thermal cure of adhesive. It is understood that some intrinsic properties of the light-sensitive adhesive can be controlled when performing the method for coupling the waveguide array to the PIC. For instance, the shrinkage upon cure, the moisture absorption and thermal expansion coefficient related displacements under thermal excursion can be controlled. Preferably, the use of one or more adhesive bond lines that are substantially flat and thin (e.g., with a thickness below 30 μm, most preferably 10 μm) and with a constant thickness reduces undesirable displacements that may occur during the step of curing.

The viscosity of the adhesive can be below 1000 Cps to get suitable layers. Epoxy-based adhesives and acrylate-based adhesives can be used. However, the use of epoxy-based adhesives can help in minimizing shrink upon curing and increase resistance to moisture absorption/desorption which can cause swelling and therefore dimensional instability that can lead to higher optical coupling losses. Selecting an adhesive with a high glass transition temperature, e.g., higher than the maximum service temperature, can promote higher dimensional stability. In an embodiment, the addition of spherical glass beads (e.g., in proportion of 5 to 10% of the adhesive total mass) can be helpful to control the thickness of the layers of adhesive and minimize wedges. An example of a nominal diameter of the glass beads can be 10 μm.

The prerequisite for using light-sensitive curable adhesives is to select optical and/or opto-mechanical components that are made up of materials that provide satisfactory optical transmission in the sensitivity spectrum of the light-sensitive adhesive, so that the light can reach the adhesive during the step of curing. It is noted that the PIC 104 generally has an overcladding which can prevent the guiding properties of the PIC 104 to be modified when the first structure 114 is directly connected to the PIC 104.

For instance, in an embodiment, and still referring to FIG. 1B, the curable adhesives 130 and 136 are light-sensitive curable adhesives, and the first structure 114 is made of a transparent material. In this case, the light-sensitive adhesives 130, 136 are cured by illuminating them through the first structure 114. In another embodiment, the first and second structures 114, 116 are made of a transparent material. In this case, the curable adhesive 136 can be cured by illuminating through the first structure 114 while the curable adhesive 130 can be cured by illuminating through the second structure 116 or, alternatively, through both the first and second structures 114, 116.

In still another embodiment, the support surfaces 122, 126 are both planar and are engaged with one another via a third curable adhesive (not shown), so that the position and orientation of the waveguide array 110 relative to the second structure 116 can be adjusted in three degrees of freedom, i.e. translation along two orthogonal axes lying in the plane of the support surfaces 122, 126 and rotation about the axis normal to the support surfaces 122, 126. More specifically, with reference to FIG. 1B, these three degrees of freedom include translations along the x and z axes and rotation about the y axis.

As it can be understood, in this embodiment, since the set of surfaces 122, 126 is parallel to the set of surfaces 118, 108, the alignment can be performed in the same five degrees of freedom described above even when the first structure 114 is made integral to the substrate 102 or to the PIC 104. In such an embodiment, the second structure 116 can be made of a transparent material, and the curable adhesive 130 and the third curable adhesive can be cured by illuminating them through the second structure 116.

Table 1 presented below indicates possible combinations of materials that can be used for the first structure 114, the second structure 116 and the waveguide array 110, based on which sets of planar surfaces are used to align the waveguide array relative to the PIC 104.

TABLE 1

Possible combinations of materials for various sets of planar surfaces used for alignment.

| Sets of planar surfaces used for alignment | Material of first structure 114 | Material of second structure 116 | Material of waveguide array 110 |
|---|---|---|---|
| set of surfaces 120, 124; and set of support surfaces 122, 126 | metal | transparent | transparent |
| set of surfaces 120, 124; and set of surfaces 118, 108 | transparent | metal | transparent |
| set of surfaces 120, 124; and set of surfaces 118, 108 | transparent | metal | metal |
| set of surfaces 120, 124; and set of surfaces 118, 108 | transparent | transparent | transparent |
| set of surfaces 120, 124; and set of support surfaces 122, 126 | silicon | transparent | transparent |

Monitoring the optical coupling efficiency of the waveguide array 110 to the PIC 104 is useful to determine when the position and orientation of the waveguide array 110 relative to the PIC 104 are satisfactory. Monitoring the optical coupling efficiency of a single waveguide of the array to a corresponding optical port can be insufficient for determining if the whole waveguide array is suitably aligned relative to the PIC. For instance, in FIG. 1C, the coupling efficiency between the waveguide 134*a* and the optical port 132*a* would be satisfactory whereas the coupling efficiency between the waveguide 134*b* and the optical port 132*b* would be unsatisfactory. Therefore, such monitoring generally includes monitoring of coupling efficiency for at least two waveguides of the waveguide array 110 and corresponding optical ports 132 of the PIC 104.

Various methods for monitoring the optical coupling efficiency can be used. These methods can include, but are not limited to: i) use of loop-back waveguide(s) of the PIC 104 (e.g., optically linking the waveguide 134*a* to the waveguide 134*b*); ii) use of photodetectors (e.g. linking the waveguide 134*a* to a first photodetector and the waveguide 134*b* to a second photodetector); and iii) use of reflectors (e.g., reflecting light propagated along the waveguide 134*a* and the waveguide 134*b*). Examples of such methods are described in the International Patent Application Pub. No. WO 2014/112949 (LI et al.) and in the technical paper entitled "Design Rules for Silicon Photonic Packaging At Tyndall Institute" published by the Tyndall National Institute (Cork, Ireland) in January 2015, the disclosures of which are hereby incorporated by reference.

The manipulator 128 can be provided, for instance, in the form of a holder, a gripper and/or a vacuum chuck. It can be operated manually or through a motorized set up. An example of such a manipulator is described in U.S. Pat. No. 6,608,959 (JANG et al.), the disclosure of which is hereby incorporated by reference.

Although connecting the first structure 114 directly to the top surface 108 of the PIC 104 may seem counterintuitive, it was preferred in some applications. Indeed, by doing so, the thermal expansion of the material of the PIC 104 can have a lesser impact on the optical alignment of the waveguide array 110 to the PIC 104, as compared to embodiments where the first structure 114 is connected directly to the substrate 102. Indeed, in the latter case, the thermal expansion of the material of the PIC 104 may differ from the thermal expansion of the material of the substrate 102 such that the optical alignment between the waveguide array 110 and the PIC 104 can be altered when the temperature of the optical assembly changes to some extent. As a result, the optical coupling losses due to temperature change can be minimized by connecting the first structure 114 directly to the PIC 104.

The first and second structures 114, 116 can be made of a material having a thermal expansion coefficient which corresponds to that of the PIC 104, its waveguides, and/or the substrate 102. A material having a low thermal expansion coefficient can also be used. An example of such a material can be fused silica or the nickel-iron alloy FeNi36, also referred to as "invar".

Figure 2A:
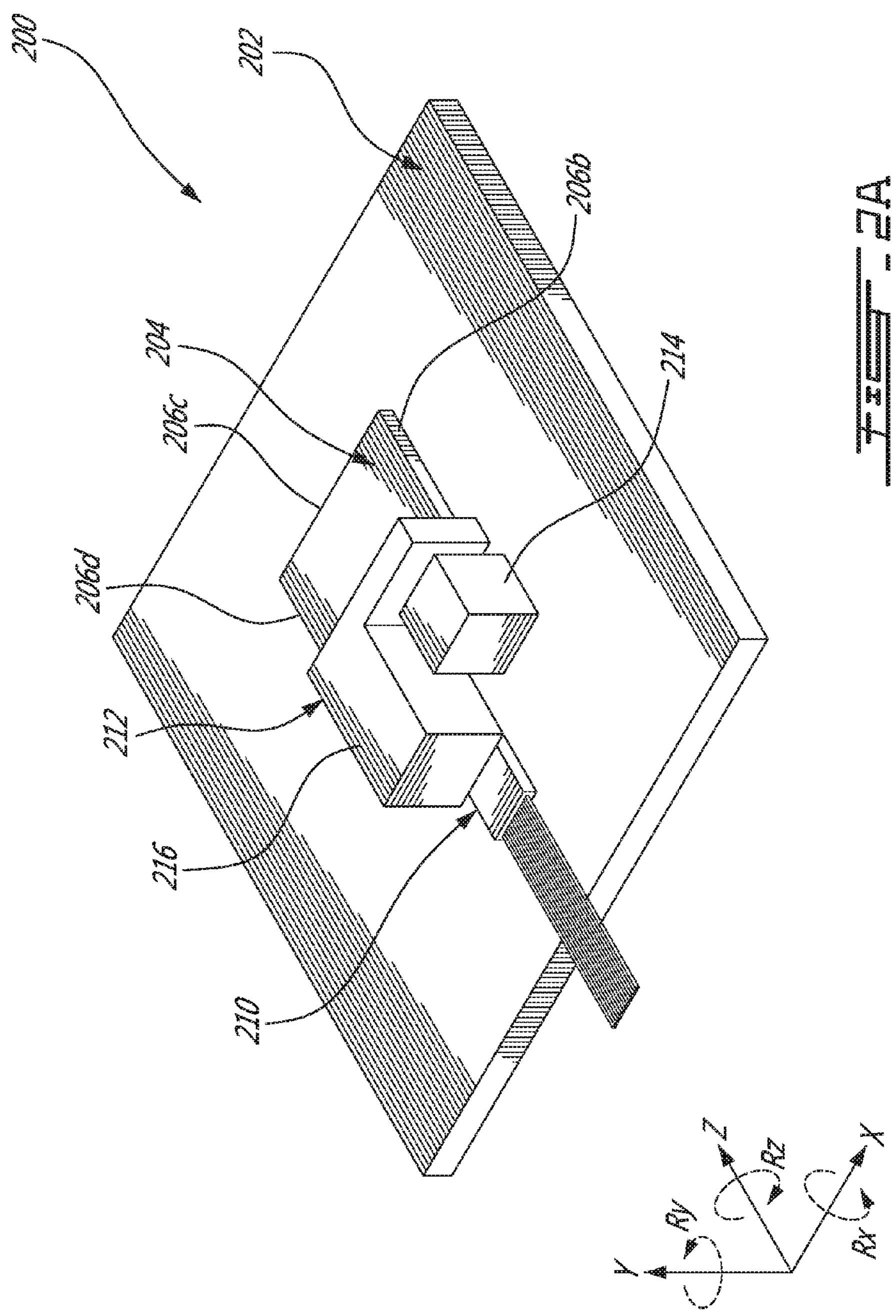
FIG. 2A is an oblique view of another example of an optical assembly having a waveguide array optically coupled to a PIC via an interconnect structure in an edge coupling configuration, the interconnect structure having a first structure directly connected to the substrate of the optical assembly.

FIG. 2A shows another example of an optical assembly 200 in an edge coupling configuration. FIG. 2B is a side elevation view of the optical assembly 200. Like elements will bear like reference numerals, but in the 200 series instead of in the 100 series.

As shown, the optical assembly 200 has the substrate 202, the PIC 204, and the waveguide array 210 which is coupled to the PIC 204 via the interconnect structure 212. More specifically, the first structure 214 is connected to the substrate 202, the second structure 216 is connected to the waveguide array 210 and the first and second structures 214, 216 are connected to one another such as to allow optical communication between the waveguide array 210 and the PIC 204.

In this example, as best seen in FIG. 2B, the first planar surface 220 faces towards the side surface 206 of the PIC 204 whereas the second planar surface 224 transversally protrudes in a lateral extension of the second structure 216 and faces away from the side surface 206 of the PIC 204. In other words, the second structure 216 has a parallelepiped shape with a recess portion forming the second planar surface 224. These first and second planar surfaces 220, 224 are connected to one another via a cured adhesive 230' and the first structure 214 is directly connected to the substrate 202 via a cured adhesive 236'. In another embodiment, such a lateral extension can be provided to the first structure 214 instead of being provided to the second structure 216.

Prior to the step(s) of curing the adhesives 230', 236', the position and orientation of the waveguide array 210 were adjustable in the same five degrees of freedom as described above, namely translations of the waveguide array 210 along the x, y and z axes and rotations of the waveguide array about the y and z axes.

FIG. 2B shows the first spacing s1 between the facet plane 240 and the optical port plane 242 therefore allowing room for translation of the bottom surface 218 of the first structure 214 along two orthogonal axes lying in the plane of the substrate 202 (e.g., translations along the x and z axes) and rotation of the first structure about the axis normal to the substrate 202 (e.g., rotation about the y axis). The second spacing s2 separates the bottom surface 246 of the waveguide array 210 from the substrate 202, therefore allowing room for translation of the second structure 216 along the axis normal to the substrate 202 (e.g., translation along the y axis) and rotation of the second structure 216 about the axis normal to the first and second planar surfaces 220, 224 (e.g., rotation about the z axis).

It is contemplated that more than one waveguide array can be coupled to the PIC using more than one interconnect structure 212, depending on the application. For instance, in the embodiment shown in FIG. 2A, another waveguide array (not shown) can be coupled to the PIC 204 via any one of side surfaces 206*b*, 206*c*, and 206*d* just like the waveguide array 210 is coupled to the PIC 204 via the side surface 206.

It will be understood that in this embodiment, one can minimize the lateral distance between the waveguide array 210 and the first structure 214 and/or minimize the distance between the facet plane 240 and the optical port plane 242 to limit the optical coupling losses that may be caused by thermal expansion of any element that forms part of the optical assembly 200.

Figure 3B:
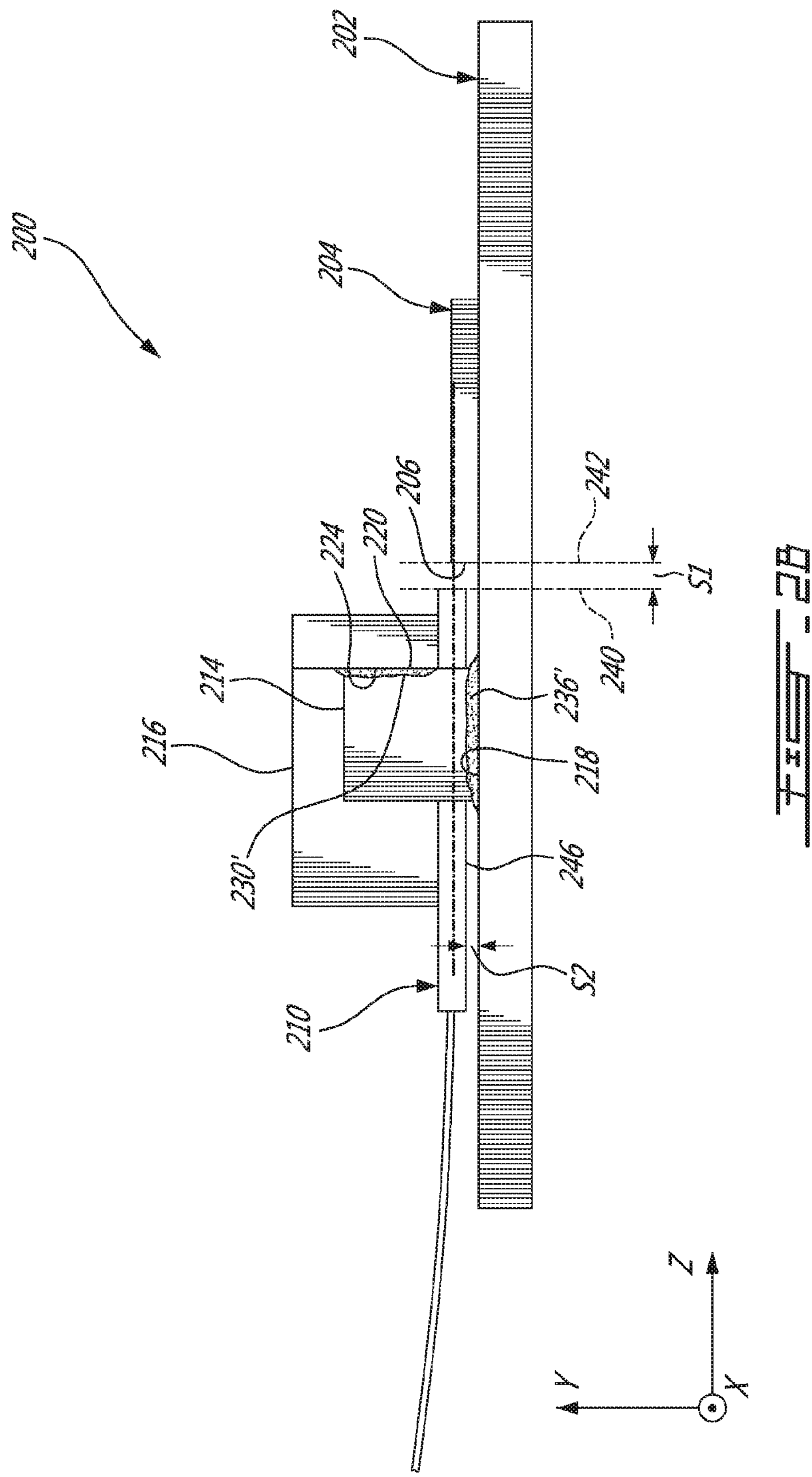
FIG. 3B is a front elevation view of the optical assembly of FIG. 3A.
Figure 3A:
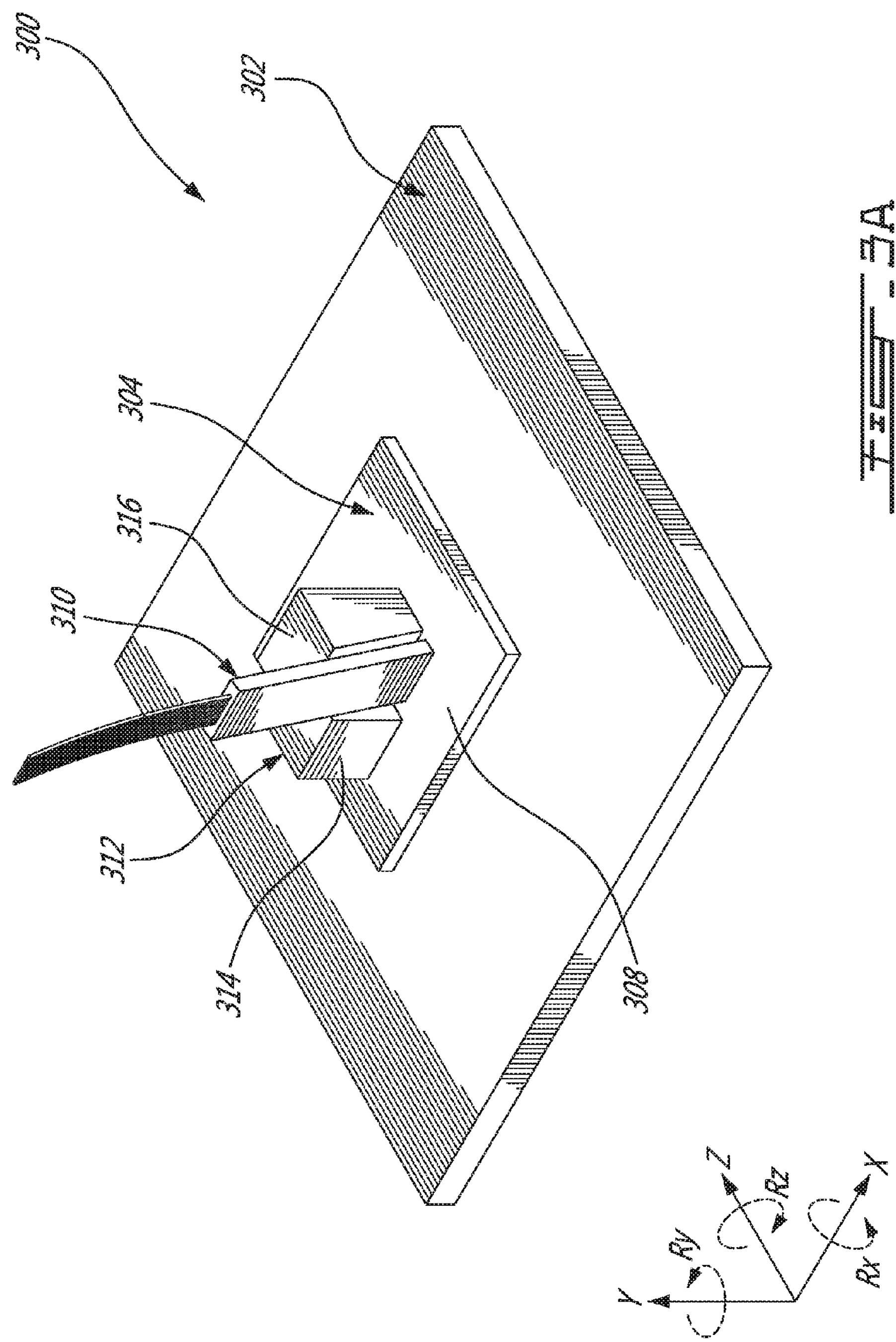
FIG. 3A is an oblique view of an example of an optical assembly having a waveguide array optically coupled to a PIC via an interconnect structure in a vertical coupling configuration, the interconnect structure having a first structure directly connected to the PIC.

FIG. 3A shows an example of an optical assembly 300 in a vertical coupling configuration. FIGS. 3B and 3C are front and side elevation views of the optical assembly 300, respectively. Like elements will bear like reference numerals, but in the 300 series instead of in the 100 series.

As shown, the optical assembly 300 has the substrate 302, the PIC 304, and the waveguide array 310 which is coupled to the PIC 304 via the interconnect structure 312. More specifically, the first structure 314 is connected to the PIC 304, the second structure 316 is connected to the waveguide array 310 and the first and second structures 314, 316 are connected to one another such as to allow optical communication between the waveguide array 310 and the PIC 304.

In this example, as best seen in FIG. 3B, the first and second planar surfaces 320, 324 are connected to one another via a cured adhesive 330' and the first structure 314 is directly connected to the PIC 304 via a cured adhesive 336'.

Considering that six degrees of freedom exist, one of these degrees of freedom is designated to be fixed because it was found that this degree of freedom was the least stringent one in the process of aligning the waveguide array 310 to the PIC 304 in the vertical coupling configuration. In the case of vertical coupling, i.e. when the optical ports of the PIC 304 are distributed along the top surface 308 of the PIC 304 and when the optical paths of the waveguide array 310 intersect (i.e. are directed towards with an angle between 5° and 25° for instance) the top surface 308 of the PIC 304, the least stringent degree of freedom was found to be the rotation about an axis given by the intersection of the first planar surface 320 with the top surface 308 of the PIC 304. With reference to FIG. 3C, this axis corresponds to the z axis.

Therefore, prior to the step(s) of curing of the adhesives 330', 336', the position and orientation of the first structure 314 were adjustable in three degrees of freedom including translations along two orthogonal axes parallel to the top surface 308 of the PIC 304 and rotation about the axis normal to the top surface 308 of the PIC 304. Moreover, the position and orientation of the second structure 316 were adjustable in two additional independent degrees of freedom including translation along the axis normal to the top surface 308 of the PIC 304 and rotation about an axis normal to the first and second planar surfaces 320, 324. In the example shown in FIG. 3C, the resulting five degrees of freedom include translations along the x, y and z axes and rotations of the waveguide array 310 about the x and y axes.

As it can be seen in FIG. 3B, the first and second structures 314, 316 are sized and shaped to permit the facet plane 340 of the waveguide array 310 to move relative to the optical port plane 342. More specifically, in this embodiment, the facet plane 340 is spaced by a fourth spacing s4 from the optical port plane 342 along the waveguide plane 344 to allow translation along the y axis and rotation about the x axis. As shown, the facet plane 340 and the optical port plane 342 can be parallel to one another. Moreover, still in this embodiment, the bottom surface 348 of the second structure 316 faces the PIC 304 such that it is suspended over the PIC 304 with a fifth spacing s5. The fifth spacing s5 can be selected to give enough room for the translation of the waveguide array 310 along the y axis and its rotation about the x axis.

Figure 4:
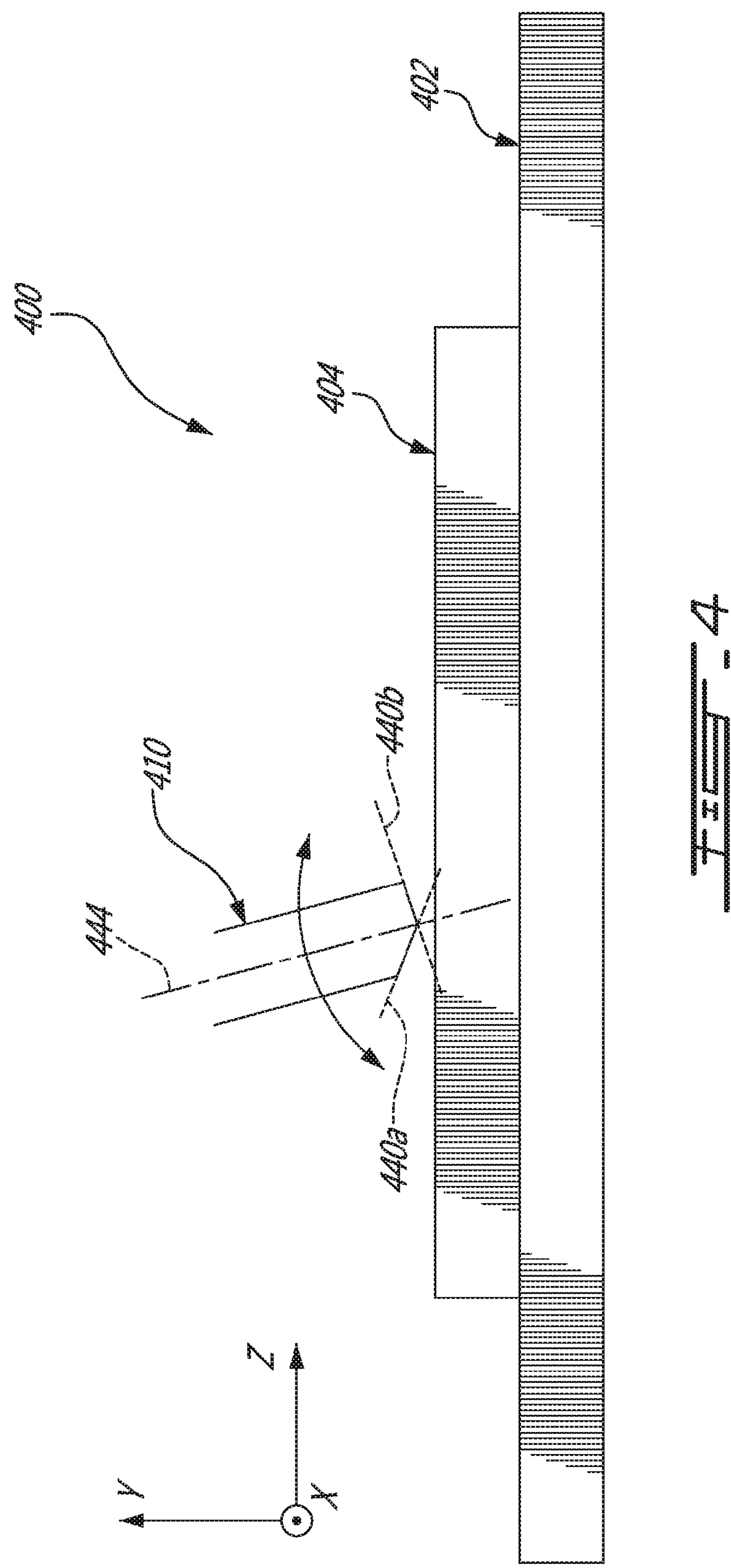
FIG. 4 is an enlarged side elevation view of a portion of an optical assembly in a vertical coupling configuration.

FIG. 4 shows an enlarged side elevation view of an optical assembly 400 having an interconnect structure similar to the interconnect structure 312 of FIGS. 3A-C in a vertical coupling configuration. Like elements will bear like reference numerals, but in the 400 series instead of in the 100 series.

As shown, prior to the step(s) of curing the adhesive(s), the position and orientation of the waveguide array 410 relative to the PIC 404 can be adjusted such as to rotate about the axis normal to the first and second planar surfaces (e.g., about the x axis in FIG. 4). In this way, the waveguide array 410 can be coupled to the PIC 404 notwithstanding that a first facet plane 440*a* of the waveguide array 410 may form a first angle relative to the waveguide plane 444 of the waveguide array 410 or that a second facet plane 440*b* of the waveguide array 410 may form a second angle relative to the waveguide plane 444.

Figure 5:
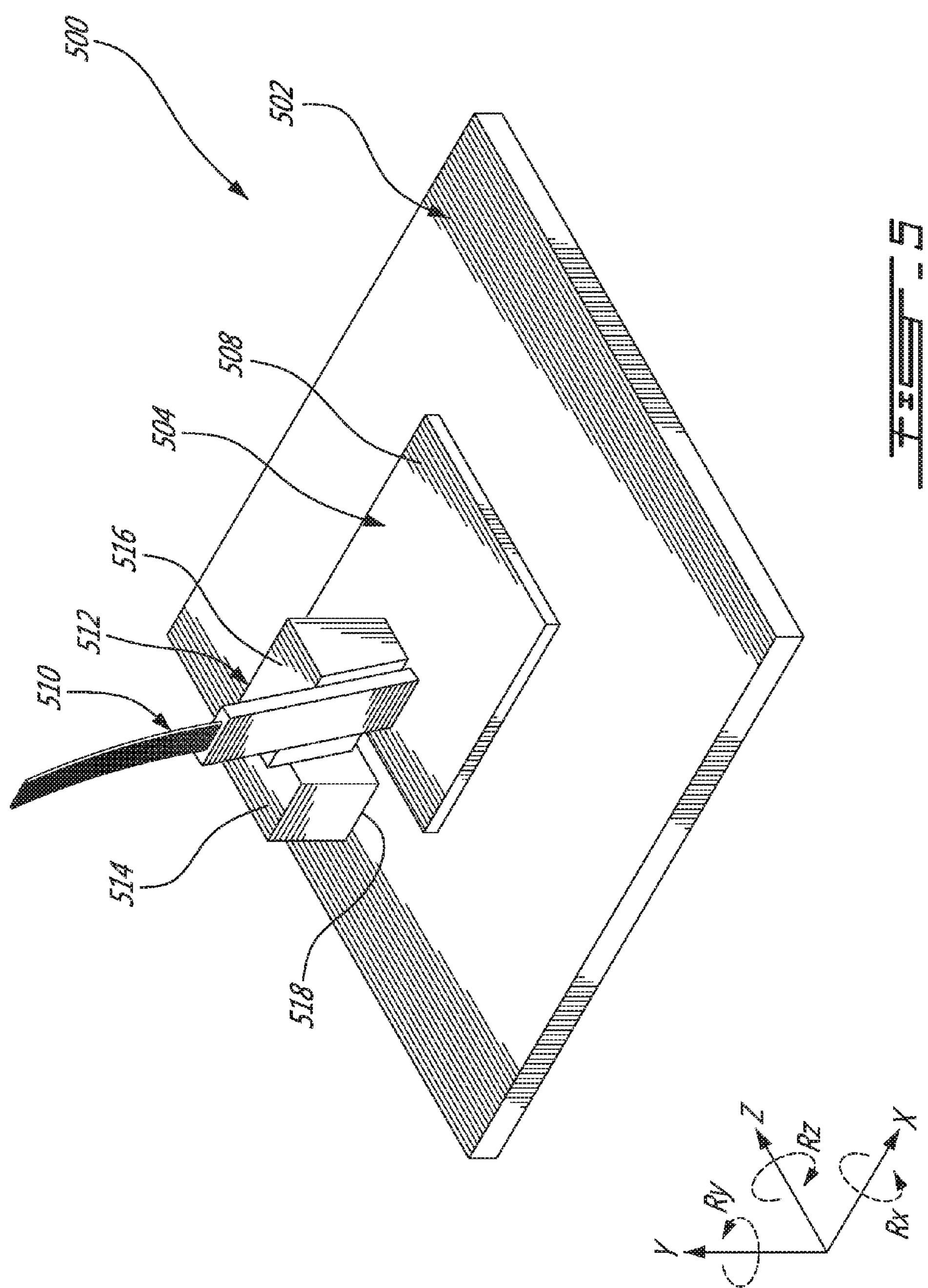
FIG. 5 is an oblique view of another example of an optical assembly having a waveguide array optically coupled to a PIC via an interconnect structure in a vertical coupling configuration, the interconnect structure having a first structure directly connected to the substrate of the optical assembly.

FIG. 5 shows another example of an optical assembly 500 in a vertical coupling configuration. Like elements will bear like reference numerals, but in the 500 series instead of in the 100 series.

In this embodiment, the waveguide array 510 is coupled to the PIC 504 through the interconnect structure 512. In contrast with the optical assembly 300, the bottom surface 518 of the first structure 514 of the interconnect structure 512 is directly connected to the substrate 502. As depicted, the second structure 516 is suspended over the top surface 508 of the PIC 504.

Figure 6A:
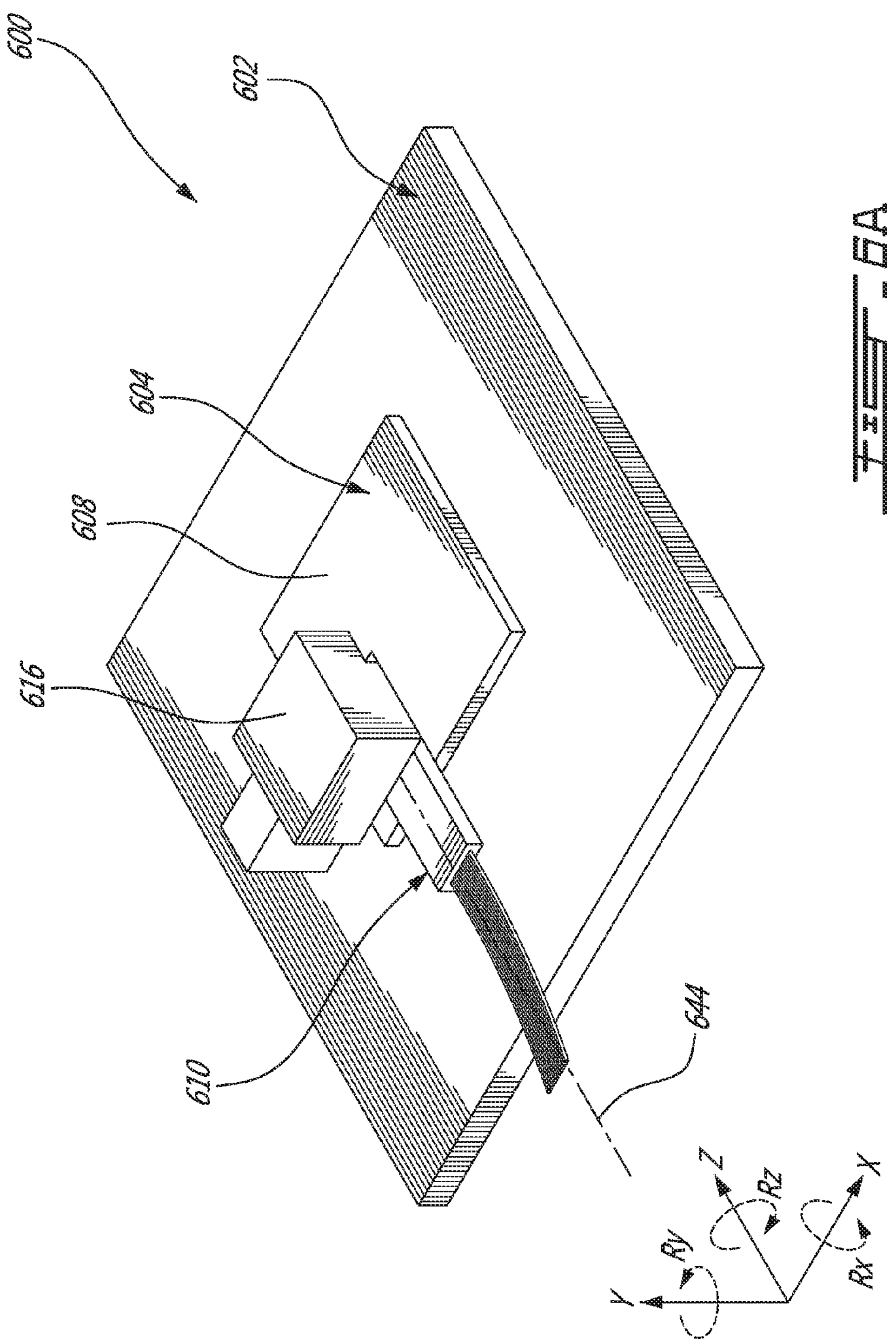
FIG. 6A is an oblique view of another example of an optical assembly having a waveguide array with angle-polished end facets optically coupled to a PIC via an interconnect structure in a vertical coupling configuration, the interconnect structure having a first structure directly connected to the substrate of the optical assembly.
Figure 6B:
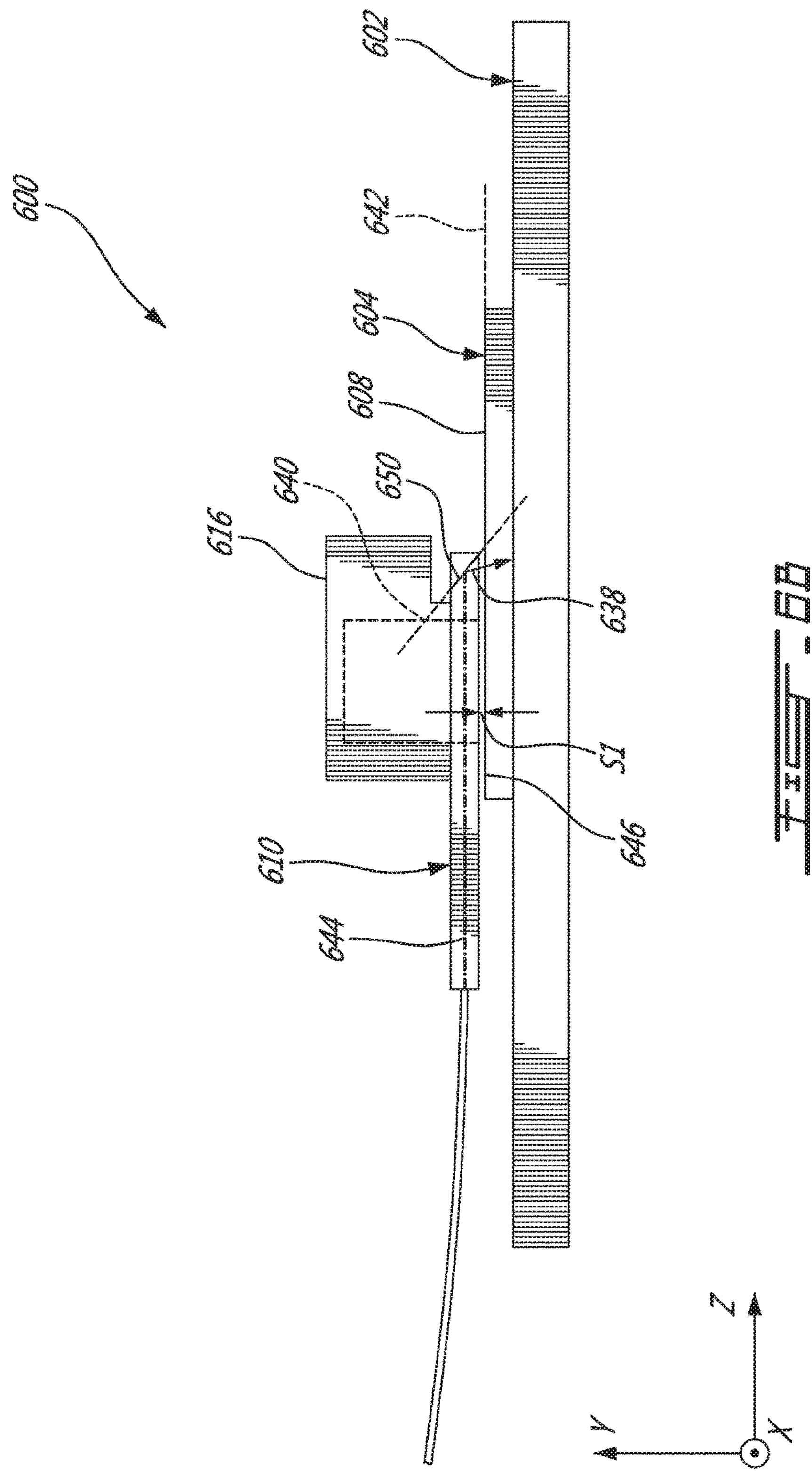
FIG. 6B is a side elevation view of the optical assembly of FIG. 6A.

FIG. 6A shows another example of an optical assembly 600 in a vertical coupling configuration. FIG. 6B shows a side elevation view of the optical assembly 600. Like elements will bear like reference numerals, but in the 600 series instead of in the 100 series.

In this embodiment, the vertical coupling can be further characterized by the fact that the second structure 616 is configured to set the waveguide array 610 such that the waveguide plane 644 is parallel to the top surface 608 of the PIC 604 and to the substrate 602. Each end facet 650 of the waveguide array 610 is thus not perpendicular to its respective waveguide such as to project a respective optical path 638 towards the optical port plane 642. In this case, the facet plane 640 is not parallel to the optical port plane 642.

As it can be seen in this example, the waveguide array 610 is suspended over the top surface 608 of the PIC 604 by the second structure 616 such that the bottom surface 646 of the waveguide array 610 is spaced from the top surface 608 of the PIC 604 by the first spacing s1.

As it will be appreciated by the skilled reader, the PIC can have a waveguide layer having a plurality of PIC waveguides therealong. The light radiated from the end facet of each waveguide of the waveguide array can be coupled into a corresponding PIC waveguide via a corresponding optical coupling structure. The coupling structure generally aims at gradually and/or adiabatically modifying the mode field diameter of a guided mode (of the optical signal as launched from a waveguide of the waveguide array) as it is coupled into the PIC waveguide. In this disclosure, each of the optical ports of the PIC can include a corresponding one of the coupling structures in a manner that when the waveguide array is optically aligned with the PIC, each optical path is directed towards a corresponding optical port so that light can be propagated from a waveguide of the waveguide array along and into the coupling structure and then along and into the PIC waveguide. In an embodiment, the PIC waveguide is provided in the form of a strip with a rectangular cross-section having, for instance, a width of 500 nm and a thickness of 220 nm. The PIC waveguide can be a silicon-on-insulator (SOI) waveguide with such dimensions. Any other dimensions and waveguide materials can also be used. It is understood that the PIC waveguides can include resonant confinement PIC waveguides (e.g., strip waveguides, ridge waveguides) and can also include anti-resonant confinement PIC waveguides (e.g., slot waveguides).

It is noted that deviations due to perpendicularity and parallelism errors in the components of the optical assembly can have a limited impact on the optical coupling losses due to the acceptance angle of the coupling structures of the PIC waveguides.

It will be understood that the coupling structures used may differ depending on whether the PIC is used in an edge coupling configuration or in a vertical coupling configuration. For instance, inverted tapered edge couplers can be used in the edge coupling configuration while grating couplers can be used in the vertical coupling configuration. Other types of coupling structures can also be used.

It is contemplated that the waveguides of the waveguide array and the optical ports can be provided in any number (e.g., 2, 4, 8, 16, 32, 64) and in various configurations. These configurations can involve symmetry, asymmetry, even and odd numbers of waveguides/optical ports, a waveguide/optical port being positioned at the center of the configuration of waveguides/optical ports, waveguides/optical ports being positioned in the form of a cross, a square, an octagon, a hexagon, or a N-sided polygon where waveguides/optical ports are positioned at least at one (or all) vertex(ices) of the N-sided polygon and alternatively along the N-sides of the N-sided polygon.

The composition of the various elements that form the optical assembly can vary from one embodiment to another. For instance, in an embodiment, the PIC is a silicon-on-insulator (SOI) circuit. In this specific embodiment, the substrate layer is made of silicon (Si) and has a thickness of several hundreds of micrometers, the insulator layer is made of buried oxide (also referred to as "BOX") and has a thickness of 2 μm, the cladding layer and cladding body are made of silicon dioxide ($SiO_2$) or silicon oxynitride ($SiO_xN_y$) having a refractive index of about 1.4787. In another embodiment, the material of the waveguide elements is any of silicon (Si), amorphous silicon, hydrogenated amorphous silicon, $SiO_2$, silicon oxide ($SiO_x$), silicon nitride ($Si_3N_4$), $SiO_xN_y$, indium phosphide (InP), an epoxy-based photoresist such as SU-8 and KMPR, polyimide (PI), benzocyclobutene (BCB) and polydimethylsiloxane (PDMS), for instance.

As can be understood, the embodiments described above and illustrated are intended to be exemplary only. For instance, the first structure can be connected directly to the substrate. In an alternate embodiment, the first structure can be directly connected to the PIC. In such an embodiment, the first structure can be understood to be indirectly connected to the substrate via the PIC. It is thus contemplated that the bottom surface of the first structure can either be connected (e.g., with flip-chip bonding) to the substrate or to the top surface of the PIC. In an embodiment, the waveguide array can be connected to the second structure using a curable adhesive. In another embodiment, the waveguide array can be connected to the second structure using a non-curable adhesive, welding or fasteners. Such connection between the waveguide array and the second structure can be made prior to the method for coupling the waveguide array to the PIC via the interconnect structure. In still a further embodiment, the waveguide array can be made integral to the second structure, for instance, when the waveguide array and the second structure are machined from a bulk structure (e.g., a bulk structure made of glass, silicon and the like). Each of the planar surfaces described herein can have one or more grooves, depending on the application. In some embodiments, the two-dimensional surfaces of the optical ports defining the optical port plane coincide with one of the surfaces of the PIC (e.g., a side surface, a top surface). However, in some other embodiments, the optical port plane, which is defined by the two-dimensional surfaces of the optical ports, does not coincide with a given surface of the PIC. For instance, the two-dimensional surfaces of the optical ports may protrude and/or recess from the given surface of the PIC. The scope is indicated by the appended claims.

What is claimed is:

1. An optical assembly comprising:

a substrate;

a photonic-integrated circuit (PIC) mounted on the substrate, the PIC having a plurality of optical ports;

a first structure having a bottom surface connected to the substrate and a first planar surface perpendicular to the substrate;

a second structure having a second planar surface connected to the first planar surface of the first structure via an adhesive, and a support surface; and a waveguide array having a support surface being connected to the support surface of the second structure, the waveguide array having a plurality of waveguides each defining an optical path, with at least two of the optical paths lying in a waveguide plane, the waveguide plane being perpendicular to the first and second planar surfaces, the at least two of the optical paths being maintained in optical alignment with corresponding ones of the optical ports via the adhered first and second planar surfaces;

wherein the first and second structures, having the first and second planar surfaces connected to each other and perpendicular to the substrate and the bottom surface of the first structure connected to the substrate, collectively provide five distinct degrees of freedom for optical alignment of the waveguide array relative to the PIC.

2. The optical assembly of claim 1 wherein at least the first structure is made of a transparent material and wherein the adhesive is a light-sensitive cured adhesive.

3. The optical assembly of claim 2 wherein the bottom surface of the first structure is planar and connected to the substrate via an adhesive.

4. The optical assembly of claim 1 wherein the second structure and the waveguide array are made integral to one another.

5. The optical assembly of claim 1 wherein the first structure is indirectly connected to the substrate via the PIC.

6. The optical assembly of claim 1 wherein the plurality of optical ports collectively defines an optical port plane perpendicular to the substrate, the waveguide array being configured so that the optical paths of the waveguide array extend parallel to the substrate and perpendicular to the first and second planar surfaces.

7. The optical assembly of claim 6 wherein the waveguide plane extends along the substrate, each waveguide of the plurality of waveguides having an end facet, the end facets defining a facet plane being parallel to the optical port plane.

8. The optical assembly of claim 7 wherein the facet plane and the optical port plane are spaced from one another by a first spacing.

9. The optical assembly of claim 7 wherein the support surface of the second structure faces the substrate, the waveguide array being suspended over the substrate with a second spacing between a bottom surface of the waveguide array and the substrate.

10. The optical assembly of claim 1 wherein the plurality of optical ports collectively defines an optical port plane parallel to the substrate, the waveguide array being configured so that the optical paths of the waveguide array intersect the optical port plane and extend parallel to the first and second planar surfaces.

11. The optical assembly of claim 10 wherein the waveguide plane intersects the optical port plane, each waveguide of the plurality of waveguides having an end facet, the end facets defining a facet plane substantially parallel to the optical port plane.

12. The optical assembly of claim 11 wherein the facet plane and the optical port plane are spaced from one another by a third spacing.

13. The optical assembly of claim 10 wherein the waveguide plane extends parallel to the substrate, the support surface of the second structure facing the substrate, the waveguide array being suspended over the substrate with a fourth spacing between a bottom surface of the waveguide array and the substrate, the facet plane forming an angle with the optical port plane.

14. The optical assembly of claim 1 wherein the first planar surface is connected to the second planar surface with remaining surfaces of the second structure being unconnected to the first structure.

15. A method for optically coupling a waveguide array to a PIC mounted on a substrate, the method using a first structure and a second structure, the PIC having a plurality of optical ports, the first structure having a bottom surface and a first planar surface, the second structure having a second planar surface and a support surface, the waveguide array having a plurality of waveguides each defining an optical path, with at least two of the optical paths lying in a waveguide plane, the waveguide array having a support surface, the method comprising the steps of:

- connecting the bottom surface of the first structure to the substrate;
- connecting the support surface of the second structure to the support surface of the waveguide array;
- using a manipulator, engaging the first planar surface of the first structure with the second planar surface of the second structure with a curable adhesive inserted therebetween, the engaged first and second planar surfaces being perpendicular to the substrate, the waveguide plane being perpendicular to the first and second planar surfaces, adjusting positions and orientations of the first and second structures to optically couple at least two of the optical paths with corresponding ones of the plurality of optical ports of the PIC, and monitoring an optical coupling efficiency of the waveguide array to the PIC while said adjusting is performed until said coupling efficiency is satisfactory; and
- curing the curable adhesive to permanently fix the positions and orientations of the first and second structures.

16. The method of claim 15 wherein at least one of the first and second structures is made of a transparent material, the step of curing including illuminating the curable adhesive through the at least one of the first and second structures.

17. The method of claim 15 wherein the bottom surface of the first structure is planar, the step of connecting the bottom surface including, using a manipulator, engaging the bottom surface with the substrate with a curable adhesive inserted therebetween, and the step of curing including curing the curable adhesives.

18. The method of claim 17 wherein the first structure is made of a transparent material, the step of curing including illuminating the curable adhesive through the first structure.

19. The method of claim 15 wherein the support surface of the second structure and the support surface of the waveguide array are planar, the step of connecting the support surfaces including, using a manipulator, engaging the support surface of the second structure with the support surface of the waveguide array with a curable adhesive inserted therebetween, and the step of curing including curing the curable adhesives.

20. The method of claim 19 wherein the second structure is made of a transparent material, the step of curing including illuminating the curable adhesive through the second structure.

21. The method of claim 15 wherein surfaces of the second structure other than the second planar surface are out of interference from the first structure during said adjusting.

22. An interconnect structure for use in optically coupling a waveguide array to a PIC mounted on a substrate, the PIC having a plurality of optical ports, the waveguide array having a plurality of waveguides each defining an optical path, with at least two of the optical paths lying in a waveguide plane, the waveguide array having a support surface, the interconnect structure comprising:

- a first structure having a bottom surface being connectable to the substrate, and a first planar surface extending in a non-parallel manner relative to the bottom surface of the first structure; and
- a second structure having a second planar surface being connectable to the first planar surface of the first structure via a curable adhesive, and a support surface being connectable to the support surface of the waveguide array, the waveguide plane being perpendicular to the first and second planar surfaces, the at least two of the optical paths being maintainable in optical alignment with corresponding ones of the optical ports via the adhered first and second planar surfaces;
- wherein the first and second structures, having the first and second planar surfaces connected to each other and perpendicular to the substrate and the bottom surface of the first structure connected to the substrate, collectively provide five distinct degrees of freedom for optical alignment of the waveguide array relative to the PIC.

23. The interconnect structure of claim 22 wherein the first planar surface is connected to the second planar surface with remaining surfaces of the second structure being unconnected to the first structure.

* * * * *